United States Patent Office 3,077,319
Patented Feb. 12, 1963

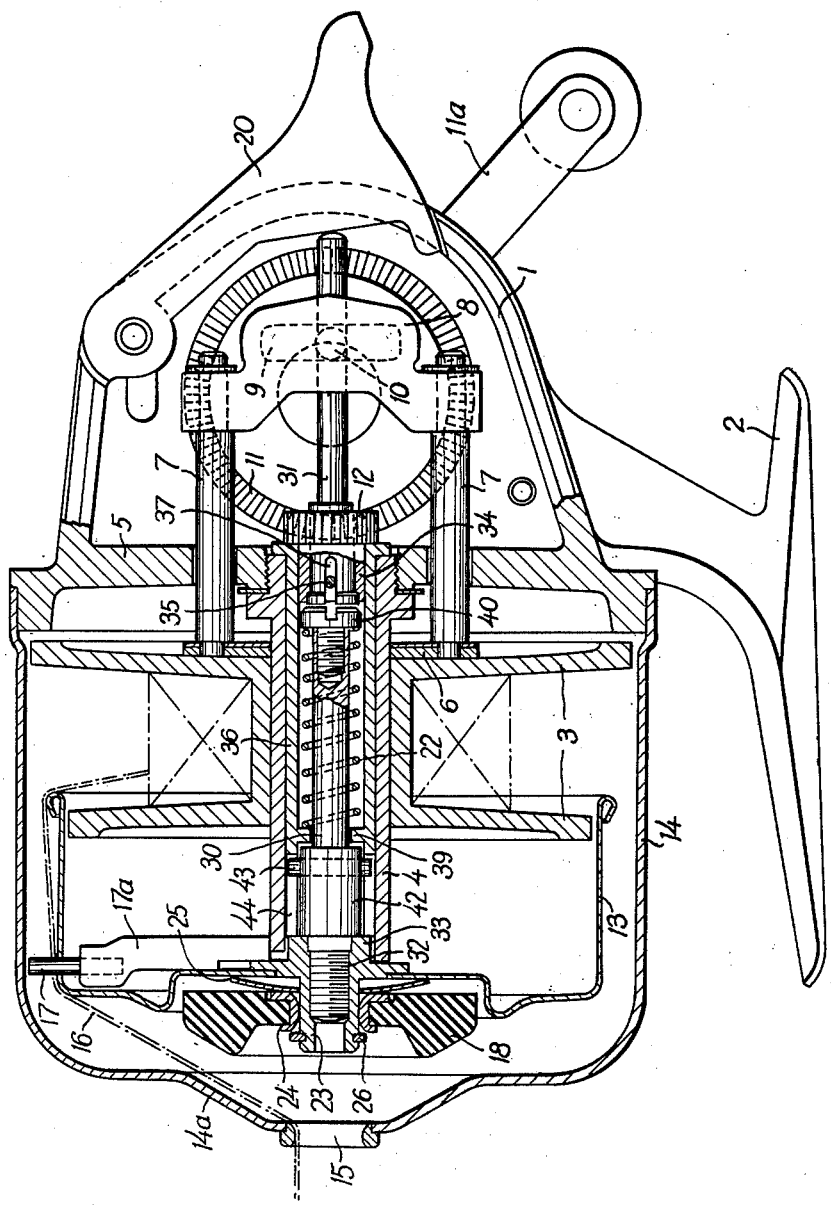

3,077,319
LINE-ARRESTING DEVICE IN REELS
FOR FISHING RODS
Karl Nurmse, Svangsta, Sweden, assignor to Aktiebolaget Urfabriken, Svangsta, Sweden, a corporation of Sweden
Filed Oct. 19, 1959, Ser. No. 847,309
Claims priority, application Sweden Oct. 24, 1958
5 Claims. (Cl. 242—84.21)

This invention relates to a line-arresting device for spinning reels in which the fishing line is peeled off axially with respect to the line spool through a line guide in a fixed reel cover and wherein a spooling member which may be cup-shaped is mounted on a longitudinally displaceable member disposed coaxially with respect to the line spool and wherein the line passes to and from the spool between the spooling member and the cover. The object of the invention is to provide a line-arresting device which causes a minimum of line wear by reducing the wear which otherwise occurs when the line is abruptly arrested at the end of the outward flow thereof. In its broadest aspect, the invention is characterized by the fact that a line-arresting member for urging the line into contact with the cover is movably mounted on the spooling member. Preferably, the arresting member is a disc which may have a conical active face and is mounted on a central hub portion of the spooling member for turning movement on the hub portion and preferably in a manner such as to be rockable and yieldable relative to the spooling member when the arresting member is moved to operative position.

The invention is described more closely hereinbelow with reference to an embodiment illustrated in the annexed drawing which shows a central longitudinal section of the reel.

Referring to the drawing, reference numeral 1 denotes a case which is rigidly secured to a tang 2 by means of which the reel can be attached to a fishing rod. Numeral 3 denotes a spool for the fishing line. The line spool is longitudinally displaceably mounted on a guide sleeve 4 which is screwed into a front wall 5 of the case 1. By means of a bayonet-like locking device the line spool 3 is connected to a plate 6 which is secured to spool actuating rods 7 guided in openings of the wall 5. Secured to the rods 7 is a yoke 8 which is displaceable by means of an eccentric pin 10 engaging a transverse groove 9 in one side face of the yoke. The pin 10 is connected to a gear 11 which can be rotated by means of a crank 11a. It will be seen that when the crank is turned a reciprocating movement will be imparted to the line spool 3.

Mounted in the stationary guide sleeve 4 is a tubular drive shaft 36 adapted to be rotated by means of a gear 12 which meshes with the larger gear 11. A cup-shaped spooling member 13 is relatively non-rotatably connected with the drive shaft. The spooling member and the line spool 3 are surrounded by a cover 14 having a central opening 15 forming a guide for the fishing line which is indicated by a chain-dotted line 16. Associated with the spooling member is a pick-up pin 17 which when the crank is turned to rotate the spooling member 13 spools the line around the reciprocating line spool 3.

The pick-up pin 17 is secured to a carrier 17a which is slidable radially along the end wall of the spooling member 13 and biased inwardly to retracted position by means of a spring, not shown. The mechanism for actuating the carrier 17a does not form part of the invention and may be of any suitably conventional type including a cam surface at the front end of the guide sleeve 4 to keep the members 17 and 17a in the projected position against the action of the above named spring when the line is to be wound onto the spool 3.

During the outward flow of the line the pick-up pin 17 is retracted so that the line can be peeled off the spool and pass between the cover 14 and the spooling member 13 which is stationary at this time. To arrest the line at the end of the outward flow, the spooling member 13 is associated with an arresting member 18 which together with the spooling member is displaceable toward the cover 14 such that the line can be snubbed between the cover 14 and the arresting member. The members 13, 18 are moved forward by means of a thumb piece 20 which is pivotally mounted in the case 1 and acts upon an arresting rod 30, 31 against the action of a return spring 22.

In the embodiment exemplified, the arresting member 18 is disc-shaped and freely mounted on a central hub 23 of the spooling member 13. The member 18 suitably consists of a resilient material, such as rubber, and has a central metallic core 24. The core 24 providing point and line contact with the hub 23 has an arcuate or spherical bearing surface so that the arresting member can slightly rock as it comes into contact with the line. Consequently, the arresting member will not only come into contact with the line, but also with the diametrically opposite side of the cover 14. At the rear of the arresting member there is provided a spring 25, such as a bowed spring washer, which maintains the arresting member in contact with an abutment 26 on the hub 23.

Due to the fact that the arresting member 18 is movably mounted the line will be arrested very smoothly without risk of wear at the end of the outward flow even if the thumb piece is quickly and forcibly depressed. The fact that the arresting member consists of a resilient material or is covered with a resilient material also adds to this effect.

Preferably, the arresting member has a conical active face adapted to engage a correspondingly conical portion 14a of the reel cover.

The arresting rod 30, 31 consists of two parts, namely, a front rod 30 which at 32 is screwed into a threaded part 33 of the hub of the spooling member 13, and a rear push rod 31, which is longitudinally displaceable through, but relatively non-rotatable with respect to, the gear 12 and an elongated hub 34 integral with the gear 12. By means of a cross-pin 35 the hub 34 is connected with the tubular drive shaft 36 which consequently can be rotated by means of the crank to wind the fishing line onto the spool 3. Within the hub 34, the push rod 31 has an open slot 37 for the pin 35. The return spring 22 is inserted between an inner radial abutment 39 in the tubular drive shaft 36 and a collar 40 on the rod 30. The collar 40 is formed by the head of a screw which is screwed into the rear end of the rod 30. The spring 22 forces the screw head against the inner end of the push rod 31. When the push rod is forced inwards by means of the thumb piece 20, the rod 30 as well as the spooling member 13 and the arresting member 18 will be moved to the arresting position against the action of the spring 22.

To transmit the rotation of the tubular drive shaft 36 to the spooling member 13, a pin 43 extending through an enlarged portion 42 of the rod 30 is slidable in longitudinal grooves 44 at the end of the tubular drive shaft.

Various modifications may be made in the embodiment illustrated in the drawing within the scope of this invention. For instance, the spooling member 13 need not be cup-shaped, and the pick-up pin 17 may be replaced by another known device serving the same purpose. The reel cover 14 may have any suitable shape, provided that it forms or carries a surface cooperating with the arresting member 18 to stop the outward flow of the fishing line. To ensure the intended movability of the arresting member 18 on the hub 23, the central opening in the member 18 may alternatively be sufficiently large to permit turning and rocking movement of this member. Further, it is possible to connect the spooling member 13 with the arresting member at a place other than the central parts of said member, such as at the outer edge of the arresting member.

What I claim is:

1. A fishing reel comprising a frame, a line spool mounted on a sleeve mounted in said frame, a spooling member rotatable to wind line onto said spool, a cover enclosing said spool and said spooling member and having a tapered-portion in whose apex there is an aperture through which said line from said spool passes, a tubular drive shaft rotatably mounted in said sleeve, a mechanism including a manual crank for rotating said tubular drive shaft, a rod axially movable relative to said tubular drive shaft and non-rotatably connected thereto, said spooling member being fixed to said rod whereby movement of said crank rotates said spooling member, a tapered arrestor member movable by said rod into contact with said tapered part of said cover to clamp the line therebetween, and a mounting for said arrestor member on said rod, said mounting including a boss at the end of said rod, said boss having an abutment at its outer end, a hub to which said arrestor member is fixed, said hub being mounted for free rotation on said boss, a resilient member interposed between said spooling member and arrestor member to force said hub into contact with said abutment on said boss, said hub and said boss having cooperating bearing surfaces of different curvature so said hub rocks relative to said boss about an axis perpendicular to said boss.

2. A fishing reel comprising a frame, a line spool mounted on a sleeve mounted in said frame, a spooling member rotatable to wind line on the said spool, a cover enclosing said spool and said spooling member and having an aperture through which said line from said spool passes, a tubular drive shaft rotatably mounted in said sleeve, means including a manual crank for rotating said tubular drive shaft, a rod axially movable relative to said tubular drive shaft, said rod being formed in two parts one of which comprises an outer part rotatable relative to said tubular drive shaft and engageable by an operator and the other of which comprises an inner part non-rotatably connected to said tubular drive shaft, said spooling member being fixed to said inner part whereby movement of said crank rotates said spooling member, an arrestor member movable by said rod to clamp the line, and mounting means for said arrestor member on said rod, said mounting means including a boss at the end of said rod, said boss having an abutment at its outer end, a hub to which said arrestor member is fixed, said hub being rotatably and slidably mounted on said boss, a spring member interposed between said spooling member and said arrestor member to force said hub into contact with said abutment on said boss, said hub and said boss having cooperation bearing surfaces of non-similar curvature to permit said hub to rock relative to said boss so their axes can be brought out of alignment.

3. A fishing reel comprising a frame, a line spool mounted on a sleeve mounted in said frame, a spooling member rotatable to wind line on the said spool, a cover enclosing said spool and said spooling member and having an aperture through which said line from said spool passes, a tubular drive shaft rotatably mounted in said sleeve, means including a manual crank for rotating said tubular drive shaft, a rod axially movable relative to said tubular drive shaft, said rod being formed in two parts one of which comprises an outer part engageable by an operator and rotatable relatively to said tubular drive shaft and the other of which comprises an inner part non-rotatably connected to said tubular drive shaft, said spooling member being fixed to said inner part so that movement of said crank rotates said spooling member, an arrestor member movable by said rod into contact with said tapered part of said cover to clamp the line, and mounting means for said arrestor member on said rod, said mounting means including a boss at the end of said rod, said boss having an abutment at its outer end, a hub to which said arrestor member is fixed, said hub having a convex bearing surface and being freely rotatable in operation relatively to said boss, a spring member interposed between said spooling member and arrestor member to force said hub into contact with said abutment on said boss, said hub being rotatable about said boss and rockable about an axis substantially perpendicular to the axis of said boss.

4. A fishing reel comprising a frame, a line spool mounted on a sleeve mounted in said frame and reciprocable on said sleeve, a spooling member rotatable to wind line onto said spol, a cover enclosing said spool and said spooling member and having a tapered-portion in whose apex there is an aperture through which said line from said spool passes, a tubular drive shaft rotatably mounted in said sleeve, a mechanism including a manual crank for rotating said tubular drive shaft and reciprocating said spool on said sleeve, a rod axially movable relative to said tubular drive shaft, said rod being formed in two parts one of which consists of a manually-engageable outer part rotatably mounted relative to said tubular drive shaft and the other of which consists of an inner part non-rotatably connected to said tubular drive shaft, said spooling member being fixed to said inner part for rotation by said crank, a tapered arrestor member made of resilient material and movable by said rod into contact with said tapered part of said cover to clamp the line, and mounting means for said arrestor member on said rod, said mounting means including a boss at the end of said rod, said boss having an abutment at its outer end, a hub to which said arrestor member is fixed, said hub having a convex bearing surface and being freely rotatable in operation relatively to said boss, a spring member interposed between said spooling member and arrestor member to force said hub into contact with said abutment on said boss, said hub being rotatable about said boss and rockable about an axis substantially perpendicular to the axis of said boss.

5. A reel comprising a frame, a line spool mounted on a sleeve mounted in said frame, a spooling member rotatable to wind line onto said spool, means including a manual crank for rotating said spooling member, a cover enclosing said spool and said spooling member and having an aperture through which said line from said spool passes, an axially-movable rod extending through said sleeve, an arrestor member, and a mounting for attaching said arrestor member to said rod whereby movement of said rod is operative to move said arrestor member into contact with said cover, a resilient spacing member positioned between said arrestor member and said spooling member to resiliently space said members, said mounting including a core to which said arrestor member is fixed, said core mounted rotatably on said rod and said core and said rod having cooperating bearing surfaces, one of said bearing surfaces being curved to provide point and line contact therebetween whereby said arrestor member can rock relatively to said rod to move the axis of said hub and rod into and out of alignment.

References Cited in the file of this patent

UNITED STATES PATENTS

| | | |
|---|---|---|
| 2,249,297 | Muffett | July 17, 1941 |
| 2,417,732 | Bland et al. | Mar. 18, 1947 |
| 2,474,961 | Sneed | July 5, 1949 |
| 2,635,714 | Butler | Apr. 21, 1953 |
| 2,644,647 | Denison et al. | July 7, 1953 |
| 2,834,559 | Nagy | May 13, 1958 |
| 2,911,165 | Sarah | Nov. 3, 1959 |

FOREIGN PATENTS

| | | |
|---|---|---|
| 660,209 | Great Britain | Oct. 31, 1951 |